(12) United States Patent
Raju et al.

(10) Patent No.: US 10,383,157 B2
(45) Date of Patent: Aug. 13, 2019

(54) SYSTEM AND METHOD FOR AUTOMATIC WIRELESS CONNECTIONS BETWEEN SERVER MANAGEMENT CONTROLLERS TO SET UP A SECURE PROXY CHANNEL

(71) Applicant: DELL PRODUCTS, LP, Round Rock, TX (US)

(72) Inventors: Arulnambi Raju, Austin, TX (US); Sajjad Ahmed, Austin, TX (US); Jeffrey M. Lairsey, Round Rock, TX (US); Minhaz Islam, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 176 days.

(21) Appl. No.: 15/676,292

(22) Filed: Aug. 14, 2017

(65) Prior Publication Data

US 2019/0053290 A1    Feb. 14, 2019

(51) Int. Cl.
| | |
|---|---|
| H04L 9/00 | (2006.01) |
| H04W 76/10 | (2018.01) |
| H04W 12/06 | (2009.01) |
| H04L 29/06 | (2006.01) |
| H04W 40/24 | (2009.01) |
| H04W 12/08 | (2009.01) |
| H04W 4/80 | (2018.01) |

(52) U.S. Cl.
CPC ......... *H04W 76/10* (2018.02); *H04L 63/0435* (2013.01); *H04W 4/80* (2018.02); *H04W 12/06* (2013.01); *H04W 12/08* (2013.01); *H04W 40/244* (2013.01)

(58) Field of Classification Search
CPC ....... H04W 4/80; H04W 12/06; H04W 12/08; H04W 40/244; H04L 63/0435
See application file for complete search history.

(56) References Cited

U.S. PATENT DOCUMENTS

| | | | |
|---|---|---|---|
| 7,886,060 B2 | 2/2011 | Rosenberg | |
| 8,370,922 B1 | 2/2013 | Doukhvalov et al. | |
| 9,391,859 B2 | 7/2016 | Huang et al. | |
| 2006/0176851 A1* | 8/2006 | Bennett ................. | H04W 88/08 370/331 |
| 2006/0190634 A1* | 8/2006 | Bennett ............... | H04M 1/7253 710/15 |
| 2010/0124881 A1 | 5/2010 | Uppunda et al. | |
| 2014/0137095 A1* | 5/2014 | Chiu ...................... | G06F 8/654 717/171 |

(Continued)

*Primary Examiner* — Beemnet W Dada
(74) *Attorney, Agent, or Firm* — Larson Newman, LLP

(57) ABSTRACT

An information handling system includes a management system and first and second first baseboard management controllers (BMCs). The first BMC includes a first wireless interface, and is coupled via a first wired interface to the management system. The second BMC includes a second wireless interface, and is coupled via a second wired interface to the management system. The information handling system detects that the BMC has become uncoupled from the management system via the first wired interface, establishes a wireless link between the first wireless interface and the second wireless interface in response to detecting that the first BMC has become uncoupled from the management system, and provides management between the first BMC and the management system via the second wired interface and the wireless link.

18 Claims, 3 Drawing Sheets

(56) References Cited

U.S. PATENT DOCUMENTS

| | | |
|---|---|---|
| 2015/0338281 A1 | 11/2015 | Ross et al. |
| 2015/0358834 A1 | 12/2015 | Cronin |
| 2016/0165649 A1 | 6/2016 | Polo et al. |
| 2016/0182130 A1* | 6/2016 | Ahmed ................ H04B 5/0081 |
| | | 455/41.1 |
| 2016/0182469 A1* | 6/2016 | Ahmed ............... H04L 63/0492 |
| | | 380/270 |
| 2017/0094632 A1 | 3/2017 | Shetty et al. |
| 2017/0142609 A1 | 5/2017 | Balasubramanian et al. |
| 2018/0084591 A1* | 3/2018 | Patel ..................... H04W 76/11 |

* cited by examiner

SYSTEM AND METHOD FOR AUTOMATIC WIRELESS CONNECTIONS BETWEEN SERVER MANAGEMENT CONTROLLERS TO SET UP A SECURE PROXY CHANNEL

FIELD OF THE DISCLOSURE

This disclosure generally relates to information handling systems, and more particularly relates to automatic wireless connections between server management controllers to set up a secure proxy channel.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a management system and first and second first baseboard management controllers (BMCs). The first BMC may include a first wireless interface, and is coupled via a first wired interface to the management system. The second BMC may include a second wireless interface, and is coupled via a second wired interface to the management system. The information handling system may detect that the BMC has become uncoupled from the management system via the first wired interface, establish a wireless link between the first wireless interface and the second wireless interface in response to detecting that the first BMC has become uncoupled from the management system, and provide management between the first BMC and the management system via the second wired interface and the wireless link.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
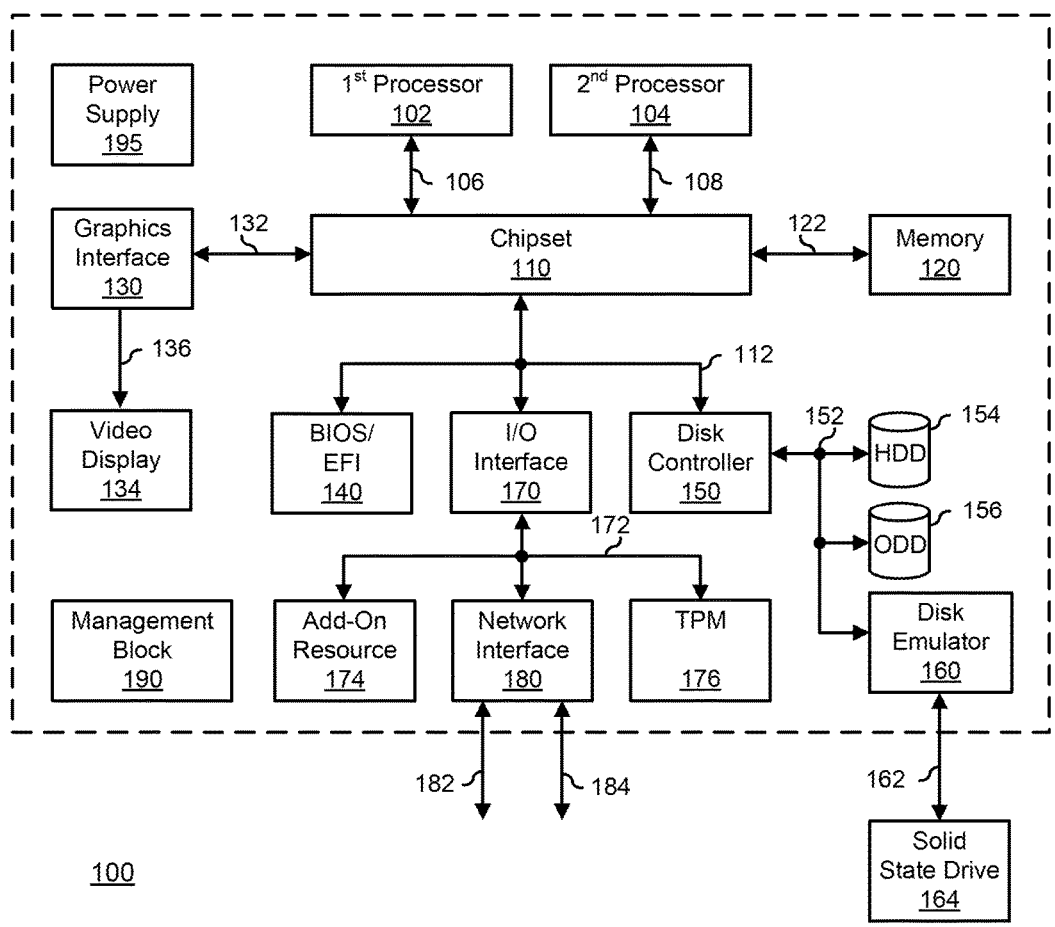
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
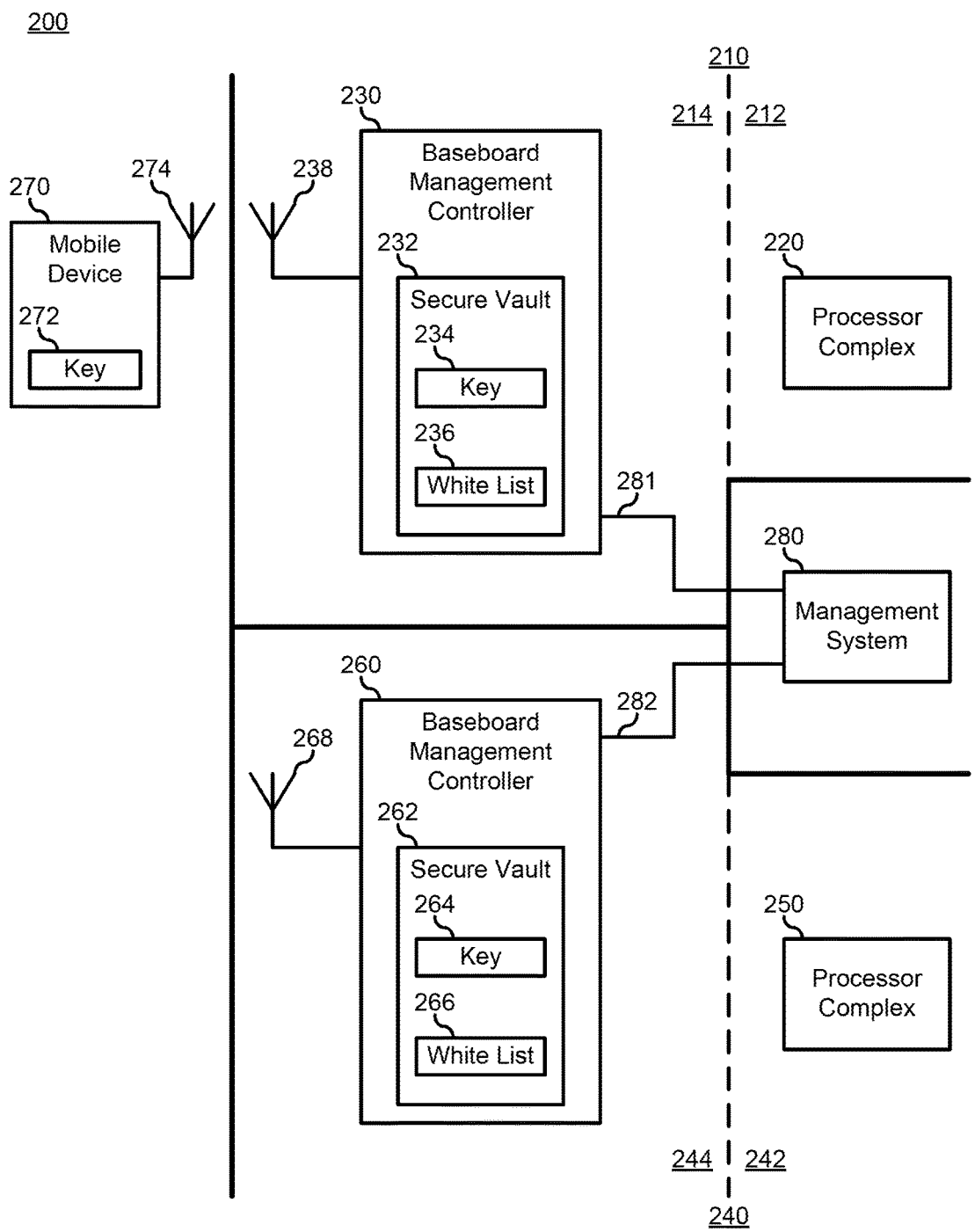
FIGS. 2 and 3 are block diagrams illustrating a data center according to an embodiment of the present disclosure.

FIG. 2 illustrates a data center 200, including a processing system 210, one or more additional processing systems 230, a mobile device 270, and a data center management system 280. Data center 200 represents a collocated group of networked information handling systems utilized by an organization to provide remote storage, processing, and distribution of large amounts of data. In a particular embodiment, the information handling systems of data center 200, such as processing systems 210 and 240, are networked together via a data backbone that provides high bandwidth communication paths between the processing systems to enable the storage, processing, and distribution of the data handled by the data center. The data backbone can be implemented as one or more network, communication, or storage fabrics, such as a Multi-Gigabit Ethernet, Fibre Channel or Fibre-Channel-Over-Ethernet (FCoE), Serial ATA, PCI-e, Serial Attached SCSI (SAS), or another stand-alone or hybrid fabric, as needed of desired.

Processing systems 210 and 240 represent information handling systems for providing various functions of data center 200, such as rack servers, blade servers, storage servers, routers, switches, power supplies, or the like, as my be typically utilized in a data center. Processing system 210 includes a host environment 212 and a management environment 214. Host environment 212 includes a processor complex 220, and operates to provide data processing functionality of processing system 210, such as is typically associated with an information handling system in a data center, as described below. As such, processor complex 220 represents a data processing apparatus, such as one or more central processing units (CPUs) or processor cores, and the associated data input and output I/O functionality, such as a chipset component, and another I/O processor components. Processor complex 220 operates to execute machine-executable code to perform the data processing tasks associated with processing system 210.

Management environment 214 includes a BMC 230, and operates to implement and manage various maintenance, operation, and system update processes for processing system 210 that are not typically associated with the data processing functionality of the processing system. For example, management environment 214 may provide for out-of-band management of the various code executed on host environment 212, such as BIOS code or UEFI code, firmware code, programs, applications, operating systems, and the like. BMC 23 can utilize an Intelligent Platform Management Interface (IPMI) protocol and one or more additional communication protocols and interfaces to perform the functions and features as described herein. In particular, management block 214 can operate on a different power plane than host environment 212, such that the management block can download and store updated code for the host environment, even when the host environment is powered off. Management environment 214 also operates to monitor and maintain the functions and features of processing system 210 that are not necessarily associated with the data processing operations performed by host environment 212, such as system thermal and cooling management, fan speed adjustment, power supply monitoring and adjustment, and the like. The mechanisms and method of system management via a BMC are known in the art and are beyond the scope of the present disclosure. BMC 230 includes a secure vault 232, and a wireless communication interface 238. BMC 230 may include one or more communication interface, as needed or desired.

Processing system 240 includes a host environment 242 similar to host environment 212, and a management environment 244 similar to management environment 214. Host environment 242 includes a processor complex 250 similar to processor complex 220. Management environment 244 includes a BMC 260 similar to BMC 230. BMC 260 includes a secure vault 262, and a wireless communication interface 268. BMC 260 may include one or more communication interface, as needed or desired.

In addition to the data backbone of data center 200, processing systems 210 and 240 are networked together via a management network that provides for the out-of-band management of the processing systems. Here, BMC 230 is shown as being connected to data center management system 280 via a connection 281 to BMC 230, and BMC 260 is shown as being connected to the data center management system via a connection 282 to BMC 260. In a particular embodiment, the management network is provided in data center 200 as a network similar to the data backbone, but that is separate from the data backbone. In another embodiment, the management network is provided in data center 200 by the data backbone, but where the management network traffic is isolated from the data traffic of the host processing system of the processing systems of the data center. For example, the management traffic can be isolated by establishing a virtual private network (VPN) between the management blocks over the data backbone. As such, connections 281 and 282 may represent an Ethernet or other network protocol connection, an internal connection to a Host Bus Adapter (HBA) that virtualizes network access to BMCs 230 and 260 via a PCIe link utilizing a Network Controller Sideband Interface (NCSI), or another network connection, as needed or desired.

Additionally, whether the management network is provided by a separate network, or is provided as isolated network traffic on the data backbone, data center 200 is configured to provide a wireless management network. Here, BMCs 230 and 260 each include respective wireless communication interfaces 238 and 268 that permit the BMCs to communicate with each other outside of the management network, and to permit a user of mobile device 270 to connect to the BMCs to gain management access to the functions and features of the BMCs. As such, wireless communication interfaces 238 and 268 represent wireless data communication interfaces for short-range wireless communications. For example, wireless communication interfaces 238 and 268 may include a wireless data communication interface for establishing a Personal Area Network (PAN), such as a Near-Field Communication (NFC) interface, a Bluetooth interface, a Bluetooth-Low Energy (Bluetooth-LE) interface, or the like, or for establishing a Wireless Local Area Network (WLAN), such as a WiFi or 802.11 interface or the like, or another wireless interface.

In a particular embodiment, processing systems 210 and 240 operate to provide a pre-connection authentication of devices which seek to make wireless connections with wireless communication interfaces 238 and 268. For example, in a typical use of a Bluetooth interface, when a device wants to establish a point-to-point wireless communication link with another device, the first device sends a beacon, the second device establishes the point-to-point wireless communication link with the first device, and both devices receive an input confirming that the point-to-point wireless communication link should be maintained, a process typically called "pairing." However, the fact that the second device operates to establish the point-to-point wireless communication link before receiving the confirmation input means that a malicious user of the first device can purposely refuse to provide its confirmation input, thereby locking up the wireless communication interface of the second device, in what is typically called a directed denial of service (DDOS) attack. In contrast to this typical Bluetooth usage model, processing systems 210 and 240 are configured to receive a beacon from a device, to perform an authentication of the device based upon the information received in the beacon, and make a determination as to whether or not to establish the point-to-point wireless communication link based upon the contents of the information in the beacon.

In a particular embodiment, processing systems 210 and 260 include whitelists that specify the devices with which they are authorized to form point-to-point wireless communication links. For example, a white list may include unique identifying information for the devices that are permitted to establish point-to-point wireless communication links. Then, when a device sends a beacon, the beacon can include that device's unique identifying information. If the target device's white list includes the unique identification of the beaconing device, then the target device can respond by establishing the point-to-point communication link. The white list may include such information as authorized MAC or IP addresses, product and serial number information, or other information which can server to uniquely identify a device as being authorized within data center 200 to establish point-to-point wireless communication links.

In this embodiment, the white lists are maintained in management environments 214 and 244. Here, the white lists may be pre-programmed into a storage device of management environments 214 and 244, such that data center 200 is originally configured to permit the establishment of point-to-point wireless communication links between the processing systems of the data center. In another case, the white lists may be dynamically maintained by management system 280. For example, when processing system 260 is newly installed into data center 200, management system 260 can provide the unique identifying information related to processing system 260 to the white list of management environment 214, and can provide the unique identifying information related to processing system 210 to the white list of management environment 244. In this way, either of BMC 230 or BMC 260 can send a beacon that includes its own unique identifying information, and the other BMC can authenticate the received unique identifying information against the white list. In yet another embodiment, whitelists 236 and 266 are populated based upon the proximity of processing systems 210 and 240 to each other. For example, BMC 230 can perform discovery operations to discover the other BMCs of data center 200, including BMC 260, and to correlate a distance between their respective processing systems based, for example, on a received signal strength indication (RSSI). BMC 230 can then define that any received signal that has an RSSI above a certain threshold is deemed to be trusted because the associated processing system is proximate to processing system 210. Any such processing systems that are deemed to be trusted can then be added to whitelist 236. In this way, a mobile device with a wireless communication interface similar to wireless communication interfaces 238 and 268 can be brought to within a predetermined proximity of processing system 210, and the mobile device can be automatically added to whitelist 236 without the whitelist needing to be pre-configured with the unique identification information of the mobile device.

It will be understood that, where a sophisticated attack is employed against data center 200, an attacker may be able to clone one or more item of unique identifying information to pass the authentication step in the target device, and may thus be able to successfully attack the target device. As such, in another embodiment, in addition to white lists 238 and 268, each device in data center 200 includes a shared encryption key. Then, when a device sends a beacon, the device encrypts the device's unique identifying information into the beacon using the shared encryption key. The target device then decrypts the beaconing device's unique identifying information using the shared encryption key and determines if the received unique identifying information is in its white list. Here, the shared encryption key may be provided to the devices of data center 200 in the same way that the white list is populated, as described above. Further, in this embodiment, the presence of the shared encryption key may obviate the use of a white list of unique identifying information. For example, instead of encoding and decoding of unique identifying information and the subsequent authentication of a beaconing device based upon a white list, particular authentication information known to all devices of data center 200 may be used in place of each device's unique identifying information. For example, each device of data center 200 may be provided with an authentication phrase or string that is then encoded/decoded to authenticate the beaconing device. In a particular embodiment, the beaconing device includes a pre-authorization key, a token, or a digital signature that is unique to the beaconing device and that is recognized and authenticated by the target device.

In another embodiment, BMC 230 communicates with management system 280 over interface 281 to confirm that BMC 260 is associated with a trusted processing system. In another embodiment, a public key is provided by management system 280 to both of BMCs 230 and 260, and, during the pairing process, both BMCs are authenticated by management system 280. Once authenticated, management system 280 passes private keys to both of BMCs 230 and 260 and the BMCs establish trust by adding each other to respective white lists 236 and 266. This way, if management system 280 is not present in future, BMCs 230 and 260 can still communicate with each other using the private key.

Secure vaults 232 and 262 represent a storage devices of respective BMCs 230 and 360 that are configured to provide cryptographically secured information, including passwords, data, encryption keys, code, or other information that requires a high root of trust for the operation of the BMCs. In a particular embodiment, secure vaults 232 and 262 represent secure storage capacities of a security co-processor of respective management environments 214 and 244 that are in conformance with a Trusted Platform Module specification ISO/IEC 1189. Secure vault 232 includes a whitelist 234 and a shared encryption key 236, and secure vault 262 includes a whitelist 264 and a shared encryption key 266, as described above.

Figure 3:
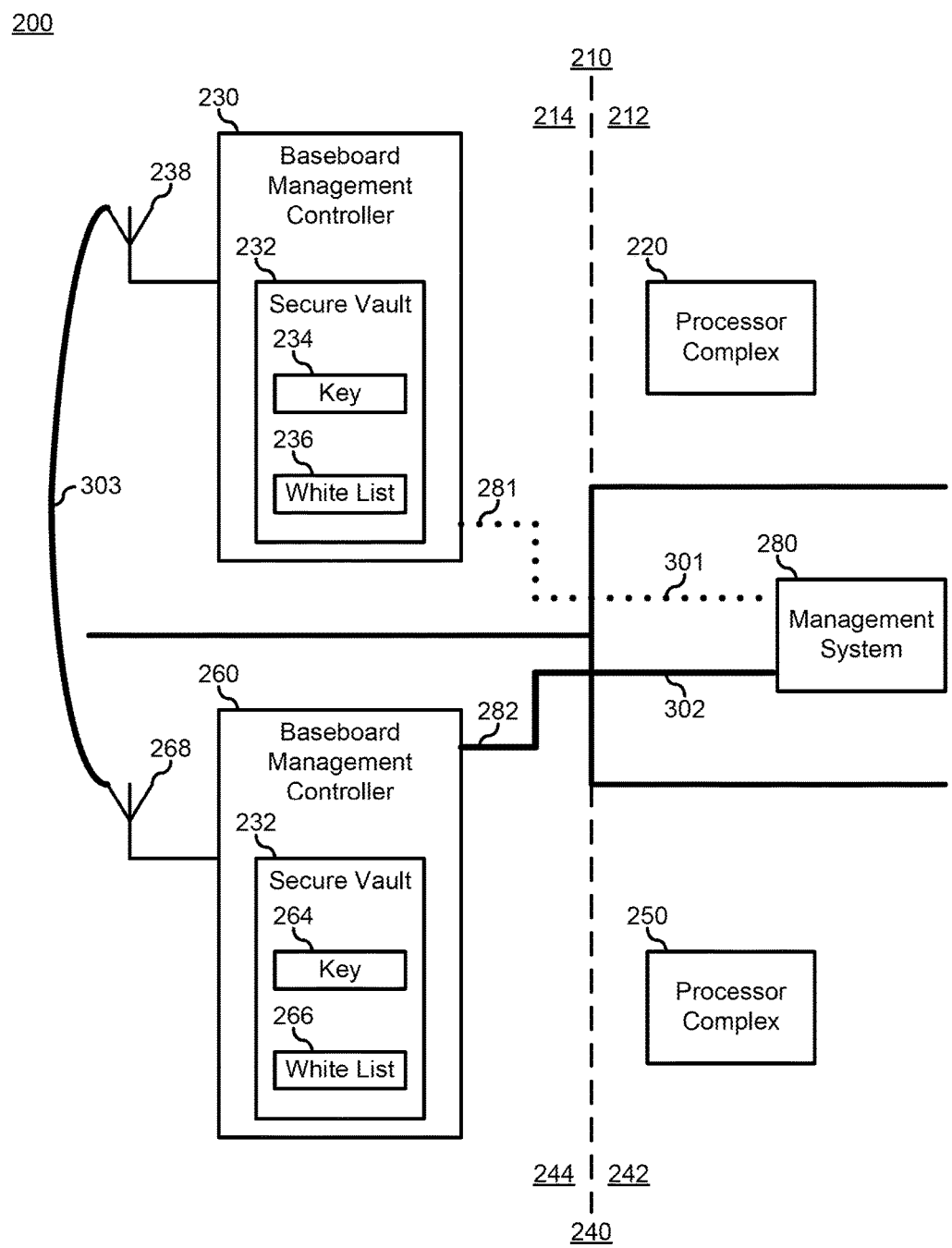

FIG. 3 illustrates the data center 200, as used in a method to provide automatic wireless connections between BMCs 230 and 260 to set up a secure proxy channel the BMCs. Here, connection 281 has become broken between BMC 230 and management system 280, as illustrated by the dashed connection 301. In response, a point-to-point wireless communication link 303 is established between wireless communication interface 238 and 268 such that BMC 230 can communicate with BMC 260 and can communicate with management system 280 using BMC 260 as proxy via connection 282, as illustrated by the heavy connection 302. In a particular embodiment, the communication is encrypted as described above.

In a first embodiment, BMC 230 detects broken connection 301, and the BMC sends a beacon on wireless communication interface 238 to broadcast that the BMC is seeking to establish a point-to-point wireless communication link with another device of data center 200. The beacon includes information that permits a target device to identify that BMC 230 is associated with data center 200. For example, the beacon can include unique identification information for BMC 230 or processing system 210 that can be included on a white list of the other devices of data center 200, and the unique identification information can be encoded using a shared encryption key, as needed or desired. In another example, the beacon can include authentication information and can be encoded as needed or desired.

Here, because processing systems 210 and 240 are both devices of data center 200, then BMC 260 authenticates the beacon from BMC 230. For example, BMC 230 can receive the unique identification information, decrypt the unique identification information if needed, and determine that the beacon is from a device in white list 266. BMC 260 then establishes point-to-point wireless communication link 303 with BMC 230, and provides an indication to management system 280 that the point-to-point wireless communication link has been established with BMC 230 via proxy connection 302. From this point, management system 280 can direct management traffic for BMC 230 via BMC 260 as proxy for BMC 230.

In another embodiment, BMC 230 does not detect broken connection 301, but management system 280 detects the broken connection. Here, management system 280 directs BMC 260 to send a beacon on wireless communication interface 268 to BMC 230, indicating that BMC 260 is seeking to establish a point-to-point wireless communication link with BMC 230. As above, the beacon includes information that permits BMC 230 to identify that BMC 260 is associated with data center 200. As a result, BMC 330 authenticates the beacon from BMC 360 and establishes point-to-point wireless communication link 303 with BMC 260. Then BMC 260 provides an indication to management system 280 that the point-to-point wireless communication link has been established with BMC 230 via proxy connection 302. From this point, management system 280 can direct management traffic for BMC 230 via BMC 260 as proxy for BMC 230.

In another embodiment, when BMC 230 discovers a catastrophic failure with its self that results in the BMC going offline, the BMC reaches out to the neighboring processing systems via wireless communication interface 238 to provide critical logs and parameters for diagnostics. Here, the log and parameter information is provided to management system 280 via BMC 260.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a management system;
   a first baseboard management controller (BMC) including a first wireless interface, the first BMC coupled via a first wired interface to the management system; and
   a second BMC including a second wireless interface, the second BMC coupled via a second wired interface to the management system;
   wherein the information handling system is configured to:
      detect that the BMC has become uncoupled from the management system via the first wired interface;
      establish a wireless link between the first wireless interface and the second wireless interface in response to detecting that the first BMC has become uncoupled from the management system; and
      provide management between the first BMC and the management system via the second wired interface and the wireless link.

2. The information handling system of claim 1, wherein, the management system is configured to:
   detect that the first BMC has become uncoupled from the management system; and
   direct the second BMC to establish the wireless link.

3. The information handling system of claim 2, wherein, in establishing the wireless link:
   the second BMC is configured to send a beacon to from the second wireless interface to the first wireless interface; and
   the first BMC is configured to determine whether the second BMC is a trusted device based upon the beacon.

4. The information handling system of claim 3, wherein:
   the beacon includes information identifying the second BMC;
   the first BMC includes the information in a white list; and
   the first BMC determines that the second BMC is a trusted device based upon the information being in the white list.

5. The information handling system of claim 3, wherein:
   the first and second BMCs each include a shared security key;
   the beacon includes authentication information encoded by the second BMC with the shared security key;
   the first BMC decodes the encoded authentication information with the shared security key; and the first BMC determines that the second BMC is a trusted device based upon the authentication information.

6. The information handling system of claim 3, wherein, in establishing the wireless link:
the first BMC is further configured to provide a response to the beacon when the first BMC determines that the second BMC is a trusted device, the response operable to establish the wireless link.

7. The information handling system of claim 1, wherein, the first BMC is configured to:
detect that the first BMC has become uncoupled from the management system; and
send a beacon to from the first wireless interface to the second wireless interface.

8. The information handling system of claim 7, wherein the second BMC is configured to determine whether the first BMC is a trusted device based upon the beacon.

9. The information handling system of claim 1, wherein the first and second wireless interfaces comprise Bluetooth interfaces.

10. A method, comprising:
coupling a first baseboard management controller (BMC) to a management system via a first wired interface, wherein the first BMC includes a first wireless interface;
coupling a second BMC to the management system via a second wired interface, wherein the second BMC includes a second wireless interface;
detecting that the BMC has become uncoupled from the management system via the first wired interface;
establishing a wireless link between the first wireless interface and the second wireless interface in response to detecting that the first BMC has become uncoupled from the management system; and
providing management between the first BMC and the management system via the second wired interface and the wireless link.

11. The method of claim 10, wherein, further comprising:
detecting, by the management system, that the first BMC has become uncoupled from the management system; and
directing, by the management system, the second BMC to establish the wireless link.

12. The method of claim 11, wherein, in establishing the wireless link, the method further comprises:
sending, by the second BMC, a beacon to from the second wireless interface to the first wireless interface; and
determining, by the first BMC, whether the second BMC is a trusted device based upon the beacon.

13. The method of claim 12, wherein:
the beacon includes information identifying the second BMC;
the first BMC includes the information in a white list; and
the first BMC determines that the second BMC is a trusted device based upon the information being in the white list.

14. The method of claim 12, wherein:
the first and second BMCs each include a shared security key;
the method further comprises:
encoding, by the second BMC, the beacon to include authentication information encoded with the shared security key;
decoding, by the first BMC, the encoded authentication information with the shared security key; and
determining, by the first BMC, that the second BMC is a trusted device based upon the authentication information.

15. The method of claim 12, wherein, in establishing the wireless link, the method further comprises:
providing, by the first BMC, a response to the beacon when the first BMC determines that the second BMC is a trusted device, the response operable to establish the wireless link.

16. The method of claim 10, wherein, further comprising:
detecting, by the first BMC, that the first BMC has become uncoupled from the management system; and
sending, by the first BMC, a beacon to from the first wireless interface to the second wireless interface.

17. The method of claim 16, further comprising:
determining, by the second BMC, whether the first BMC is a trusted device based upon the beacon.

18. The method of claim 10, wherein the first and second wireless interfaces comprise Bluetooth interfaces.

* * * * *